US008212768B2

(12) United States Patent
Fein et al.

(10) Patent No.: US 8,212,768 B2
(45) Date of Patent: Jul. 3, 2012

(54) DIGITAL, DATA, AND MULTIMEDIA USER INTERFACE WITH A KEYBOARD

(75) Inventors: Gene S. Fein, Lenox, MA (US); Edward Merritt, Lenox, MA (US)

(73) Assignee: Fimed Properties AG Limited Liability Company, Wilmington, DE (US)

( * ) Notice: Subject to any disclaimer, the term of this patent is extended or adjusted under 35 U.S.C. 154(b) by 1042 days.

(21) Appl. No.: 11/932,731

(22) Filed: Oct. 31, 2007

(65) Prior Publication Data
US 2009/0109176 A1 Apr. 30, 2009

(51) Int. Cl.
G06F 3/033 (2006.01)

(52) U.S. Cl. ........ 345/156; 345/158; 345/173; 345/168; 345/419; 715/848; 715/852; 715/710; 715/789; 715/811; 715/816

(58) Field of Classification Search .................. 345/168, 345/156, 157, 169, 173, 419; 715/848, 852, 715/710, 780, 789, 811, 816
See application file for complete search history.

(56) References Cited

U.S. PATENT DOCUMENTS

| 4,593,967 | A | 6/1986 | Haugen |
| 4,818,048 | A * | 4/1989 | Moss ................................ 345/7 |
| 5,675,437 | A * | 10/1997 | Hart et al. ...................... 359/566 |
| 5,812,292 | A | 9/1998 | Garcia |
| 6,031,519 | A | 2/2000 | O'Brien |
| 6,147,773 | A | 11/2000 | Taylor et al. |
| 6,243,054 | B1 | 6/2001 | DeLuca |
| 6,377,238 | B1 | 4/2002 | McPheters |
| 6,388,657 | B1 | 5/2002 | Natoli |
| 6,507,353 | B1 | 1/2003 | Huard et al. |
| 6,650,318 | B1 * | 11/2003 | Arnon ........................... 345/168 |
| 6,667,751 | B1 | 12/2003 | Wynn et al. |
| 7,054,045 | B2 | 5/2006 | McPheters et al. |
| 7,084,857 | B2 | 8/2006 | Lieberman et al. |
| 7,185,271 | B2 | 2/2007 | Lee et al. |
| 7,262,783 | B2 | 8/2007 | Kramer et al. |
| 7,312,786 | B2 | 12/2007 | Anderson et al. |
| 7,336,263 | B2 * | 2/2008 | Valikangas ................... 345/173 |
| 7,634,741 | B2 | 12/2009 | Klein |
| 7,844,599 | B2 | 11/2010 | Kasperski et al. |
| 2002/0070921 | A1 | 6/2002 | Feldman |

(Continued)

OTHER PUBLICATIONS

Final Office Action for U.S. Appl. No. 11/928,235, mailed on Oct. 11, 2011.

(Continued)

Primary Examiner — Lun-Yi Lao
Assistant Examiner — Olga Merkoulova
(74) Attorney, Agent, or Firm — Schwabe, Williamson & Wyatt, P.C.

(57) ABSTRACT

A system and corresponding method for providing a 3-dimensional (3-D) user interface to display images in a 3-D coordinate system. The 3-D interface generates and displays one type of holographic keyboard in response to a user's desired selection. The holographic keyboard provides versatility and ergonomic benefits to the user. Sensors are configured to sense user interaction within the 3-D coordinate system, so that a processor may receive user interaction information from the sensors. The sensors are able to provide information to the processor that enables the processor to correlate user interaction with images in the 3-D coordinate system. The system may be used for interconnecting or communicating between two or more components connected to an interconnection medium (e.g., a bus) within a single computer or digital data processing system.

25 Claims, 6 Drawing Sheets

U.S. PATENT DOCUMENTS

| | | |
|---|---|---|
| 2002/0075240 A1 | 6/2002 | Lieberman |
| 2004/0095315 A1 | 5/2004 | Montellese |
| 2004/0106090 A1 | 6/2004 | Higgins et al. |
| 2004/0119746 A1 | 6/2004 | Mizrah |
| 2004/0193441 A1* | 9/2004 | Altieri .............................. 705/1 |
| 2005/0140660 A1* | 6/2005 | Valikangas ................... 345/173 |
| 2005/0277467 A1 | 12/2005 | Karabin et al. |
| 2005/0289472 A1 | 12/2005 | Morita et al. |
| 2006/0098089 A1 | 5/2006 | Sofer |
| 2006/0167971 A1 | 7/2006 | Breiner |
| 2006/0229108 A1 | 10/2006 | Cehelnik |
| 2007/0130128 A1 | 6/2007 | Garg et al. |
| 2007/0169066 A1 | 7/2007 | Nielsen |
| 2007/0183012 A1 | 8/2007 | Cadet et al. |
| 2007/0211023 A1 | 9/2007 | Boillot |
| 2007/0266428 A1 | 11/2007 | Downes et al. |
| 2008/0005703 A1 | 1/2008 | Radivojevic et al. |
| 2009/0102603 A1 | 4/2009 | Fein et al. |
| 2009/0109174 A1 | 4/2009 | Fein et al. |
| 2009/0109175 A1 | 4/2009 | Fein et al. |
| 2009/0109215 A1 | 4/2009 | Fein et al. |
| 2009/0113348 A1 | 4/2009 | Fein et al. |
| 2009/0267895 A1* | 10/2009 | Bunch ........................... 345/157 |

OTHER PUBLICATIONS

Non Final Office Action for U.S. Appl. No. 11/875,641, mailed on Sep. 29, 2011.

Non Final Office Action for U.S. Appl. No. 11/928,235, mailed Mar. 6, 2012.

Office Action for U.S. Appl. No. 11/875,641, mailed Feb. 16, 2011, 13 pages.

Office Action for U.S. Appl. No. 11/928,235, mailed Dec. 23, 2010, 19 pages.

Office Action for U.S. Appl. No. 11/928,235, mailed Jun. 6, 2011, 20 pages.

Non Final Office Action for U.S. Appl. No. 11/932,372, mailed Jun. 21, 2011.

Final Office Action for U.S. Appl. No. 11/875,641, mailed Jul. 19, 2011.

Notice of Allowance for U.S. Appl. No. 11/932,372, mailed Dec. 13, 2011.

Final Office Action for U.S. Appl. No. 11/875,641, mailed Apr. 23, 2012.

* cited by examiner

DIGITAL, DATA, AND MULTIMEDIA USER INTERFACE WITH A KEYBOARD

BACKGROUND OF THE INVENTION

The invention would be better understood if theoretical concepts would be explained in some detail. A hologram is a medium containing information and is nothing more than a high contrast, very fine grain, black and white photographic film. There are several different types of holograms and discussion of each type will be separately addressed below.

The first type is a transmission hologram. In order to playback a hologram, the hologram's reference beam must be shone back through the hologram at the same angle relationship as it had in construction. This is where the term transmission hologram arises. Transmission merely means that the reference beam must be transmitted through the hologram in order for the image to be reconstructed. A part of the original beam goes through a glass and a part is reflected at the same angle as its incident. This allows one to bring in the reference beam from an infinite number of angles in relation to the object directed beam, thus, avoiding an inconvenience in playback of having to look directly in the reference beam as with the in-line, transmission hologram.

A transmission type hologram means that the reference beam must be transmitted through the hologram, in order to decode the interference patterns and render the reconstructed image. The light which is used for playback must be coherent or semi-coherent or the image will not be sharp. If a non-coherent source, such as a light from a common, unfiltered slide projector is used, then the hologram will diffract different wavelengths. The interference pattern or grating etched in the emulsion is not particular as to which wavelengths it bends or focuses; therefore, an unclear overlapping spectrum of colors resembling the object is produced.

A hologram will playback just as well with laser light of a different color or wavelength than the light with which it was made. However, the object will appear to be of a different size and/or distance from the plate. For example, a hologram of an object made with neon or red light will playback that object smaller or seemingly further away if a blue color laser is used. This is because the grating will bend the blue or shorter light less severely than the red with which it was made and with which it is meant to be decoded.

Another type of a hologram is plane or volume hologram. In a plane transmission hologram, the reference beam is hitting the film from the same side as the object beam. In a volume reflection hologram, the reference beam makes an arc clear around so that it hits the film from the opposite side as the modulated object beam.

The hologram can be viewed in white light or light which contains many different wavelengths. The one requisite is that the light be from a point source and be a somewhat straight line, such as a slide projector light or penlight, or the sun on a clear day. The reflection hologram can do this because in a way it acts as its own filter. In a reflection hologram the fringes are packed so closely together that they constitute layers throughout the thickness of the emulsion. The spacing between fringes remains constant. If a distance between a first fringe and a second fringe is two microns, for example, then the distance between the remaining layers of fringes will also be two microns. This distance is a function of the wavelength of light used in constructing the hologram and also the angle difference between reference and object beams. This layered affair allows the reflection hologram to absorb, or not reflect, any of the colors or wavelengths of light which are not the correct length. The wavelength which matches the fringe spacing will be reflected: the crests of the wavelengths which are too short or too long will eventually miss one of the planes and be absorbed into the darkness of the emulsion. In a reflection type hologram, the playback light or reconstruction beam comes from the same side of the hologram as the viewer. Some parts of the incident light are reflected, some are not, depending on the interference pattern. If the hologram was made correctly the result should be a visible three-dimensional image. In the transmission type hologram, the reconstruction beam must pass through the hologram and come towards the viewer from the opposite side of the hologram while in the reflection type the playback source comes from the same side of the hologram as the viewer.

Another type of a hologram is a multiplex hologram. This type of a hologram has a more common usage in today's technology. The multiplex hologram is the holographic storage of photographic information. In the first stage a series of photographs or a certain amount of motion picture footage of the subject is exposed. The number of stills or frames taken depends on how much of an angle of view of the subject is desired in the finished hologram. For example, if a 360-degree view of the subject, exposure of three frames per degree of movement around the subject is recommended (usually the camera remains stationary and the subject rotates) this will result in the exposure of 1080 frames. The film must be developed and using a laser, a series of "slit" holograms using each frame of film as a subject for each slit of holographic film must be made. The slits are usually about one millimeter wide and are packed so closely that there is no "dead space" in between. Also, the hologram is bleached so that the strips disappear. Usually a multiplex hologram yields a horizontal not a vertical parallax. This is because the camera usually moves around (or the subject moves around in front of the camera) and does not usually pass over the subject. Also, psychologically, horizontal parallax is much more desirable and the lack of horizontal parallax is much more noticeable than the lack of vertical parallax. The multiplex hologram is usually, though not always, made on flexible film coated with the same holographic emulsion as the plates. The procedure can be totally mechanical so that a machine can expose a slit hologram per each frame of footage at a very rapid pace. The advantage of this type of hologram is that it is possible to have a hologram of almost anything captured on an ordinary film without a need of an expensive, clumsy procedure. The disadvantage is that it is not truly a hologram but photographic information holographically stored.

There are several U.S. patents available, however, none of them fulfill the particular need that the present invention addresses. U.S. Pat. No. 6,031,519 to O'Brien teaches a holographic direct manipulation interface comprising an apparatus for displaying a hologram, detection sensors of any movement relative to the hologram and a processing means for covering a location of a detected object directly relative to its position on the displayed hologram into an output signal.

A graphical user interface (GUI) is a type of computer application user interface that allows people to interact with a computer and computer-controlled devices. A GUI typically employs graphical icons, visual indicators or special graphical elements, along with text, labels or text navigation to represent the information and actions available to a user. The actions are usually performed through direct manipulation of the graphical elements.

Holographic images can be created as single or consecutive images using available holographic technology. These technologies include mirrors, lasers, light and images strategically positioned to cause the proper reflection to yield a holographic image broadcast through an entry point in the laser and mirror positioning system. Black background and rooms with low or no light may enhance the appearance of the holographic image or images, which may also use a holographic plate as a display medium. Holographic systems may be large in size and spread out over a large broadcasting area or may be compact enough to fit in spaces smaller than a desk top. Holographic technology is only limited in size by the size of the component parts. By using holographic technology, images may be displayed multi-dimensionally, rather simply on a planar projection.

Currently, progress has been made in technologies that can enhance the capability and range of holographic media in projects that employ multi-million mirror systems and via companies that have designed specialized high speed and high capacity micro processors for specialized jobs, other than holographic systems, where the technology could be applied to holographic technologies to make possible the proper positioning of millions of mirrors at a rate of between 24 to 60 or more frames of video per second, with corresponding synched audio.

Holographic displays generated over the last 20-year period utilize various configurations including lasers with images on glass plates such as an AGFA 8E75HD glass plate or other glass plates as well a laser such as a Spectra Physics 124B HeNe laser, a 35 mW laser diode system utilizing different processing methods such as pyrochrome processing. Split beam techniques can also use Multi H1 to Multi H2. Such configurations as 8×10, triethanolomine, from Linotronic 300 image setter film are also commonly utilized or a configuration with rear-illuminated for 30×40 cm reflection hologram, where a logo floats 18-inches in front of the plate.

There are methods and devices available for entering data and commands into computers and other electronic equipment, such devices including, for example, keyboards, key pads, light pens, mice, pushbuttons, touch screens and trackballs. All of these input devices share a common feature: they require tangible physical contact by a user of the computer or electronic equipment. However, holographic images involve no tangible physical contact between the human operator and the control elements of the input devices because the input devices are holographic images of keys or other customarily touch-activated tangible input elements. Operator interaction with those holographic images may be detected through, for example, electromagnetic means or other means, obviating the need for direct physical contact with any solid input object or surface. Moreover, several known apparatuses for holographic projections capable of producing different images require a projection onto a flat surface. Additionally, the known apparatuses may project only one type of holographic images. The apparatuses do not have the versatility of being able to load different type of images. In other words, for each device, there is one type of holographic image.

SUMMARY OF THE INVENTION

Some user interfaces have adopted a multi-dimensional interface approach. For example, the "heliodisplay" of IO2 Technology, LLC of San Francisco, Calif. projects images into a volume of free space, i.e., into an aerosol mixture such as fog or a gas, and may operate as floating touchscreen when connected to a PC by a USB cable. However, with the heliodisplay, the image is displayed into two-dimensional space (i.e., planar). While the Heliodisplay images appear 3 dimensional ("3-D"), the images are planar and have no physical depth reference.

Unfortunately, these existing uses have certain limitations in distribution and deployment. For example, functionally, the heliodisplay is a two-dimensional display that projects against a curtain of air, or even glass. While the heliodisplay may give the appearance of 3-D, the images displayed and the interface are 2-D. As such, the heliodisplay is not a true 3-D holographic display, and thus the interface operates on a two-dimensional plane, not taking advantage of a full three-dimensional coordinate system.

Accordingly, there is a need for an integrated User Interface that utilizes true 3-D technology to create a computing and multimedia environment where a user can easily navigate by touch, mouse or pointer system to effectively navigate the interface to raise the level of the user experience to a true 3-D environment, with the goal of attaining elements of the attenuated clarity, realism and benefits of that environment that match our day-to-day conventional interactions with the 3-D world. The present invention relates to the creation of a holographic user interface display system that combines physical media or digitally stored files with a digital holographic player hardware system. The result is the creation of a multimedia holographic user interface and viewing experience, where a variety of graphical schematics enabling cohesive access to information utilizing pyramids, blocks, spheres, cylinders, other graphical representations, existing templates, specific object rendering, free form association, user delegated images and quantum representations of information to form a user interface where the available tools combine over time to match a users evolving data and requests.

In one example embodiment of the invention, a system and corresponding method for providing a 3-D user interface involves displaying images in a 3-D coordinate system. Sensors are configured to sense user interaction within the 3-D coordinate system, so that a processor may receive user interaction information from the sensors. The sensors are able to provide information to the processor that enables the processor to correlate user interaction with images in the 3-D coordinate system. The images in the 3-D coordinate system are a holographic keyboard that is made in consideration of the limitations as discussed above.

An embodiment of the present invention relates the creation of a holographic user interface keyboard system. The system is provided for allowing an operator to control more than one electronic or electro-mechanical device of the type conventionally controlled by a separate tangible control mechanism having at least one of a plurality of customarily touch-activated tangible input objects, where physical contact produces a response by the more than one electronic or electro mechanical devices. The system allows such control without the operator physically touching any solid object. The system is capable of displaying the holographic keyboard on a variety of surfaces, such a flat, contour, non-flat, or any combination thereof type of surfaces. Furthermore, the holographic keyboard may also be displayed in thin air, thereby eliminating the need of any type of surface.

Although most keyboards operate on the same principle, there are many variations of the type of keyboards. As such, in another embodiment of the present invention, the system stores a variety of holograms that is capable of being retrieved/loaded in response to an operator's desire of a certain type of keyboard.

In yet another embodiment of the invention provides a 3-dimensional (3-D) projector configured to generate and display one type of holographic keyboard amongst a plurality of holographic keyboards in a 3-D coordinate system in response to a user's desired selection. The system includes at least one database configured to store a plurality of holograms. The at least one database communicates with the 3-D projector to generate and display the one type of holographic keyboard. A plurality of sensors configured to sense user interaction within the holographic keyboard in the 3-D coordinate system. A processor configured to receive user interaction information from the plurality of sensors in response to the plurality of sensors being activated upon interception of a path of the plurality of sensors. A software database may communicate with the processor to provide logic for the plurality of sensors to sense the user interaction and retrieve the displayed holographic keyboard.

Embodiments of the invention provide a holographic user interface which transforms the computing environment to enable a three-dimensional holographic style user interface and display system. The system utilizes holographic projection technology along with programmed quadrant matrixes sensor field to create multiple methods to select and interact with data and user interface tools and icons presented in a holographic format. The system may be used for interconnecting or communicating between two or more components connected to an interconnection medium (e.g., a bus) within a single computer or digital data processing system.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the invention.

DETAILED DESCRIPTION OF THE INVENTION

A description of example embodiments of the invention follows.

The present invention, in accordance with one embodiment relates to the creation of a holographic user interface which transforms the computing environment to enable a three-dimensional (3-D) holographic style user interface and display system. The system utilizes holographic projection technology along with programmed quadrant matrixes sensor field to create multiple methods to select and interact with data and user interface tools and icons presented in a holographic format.

Figure 1:
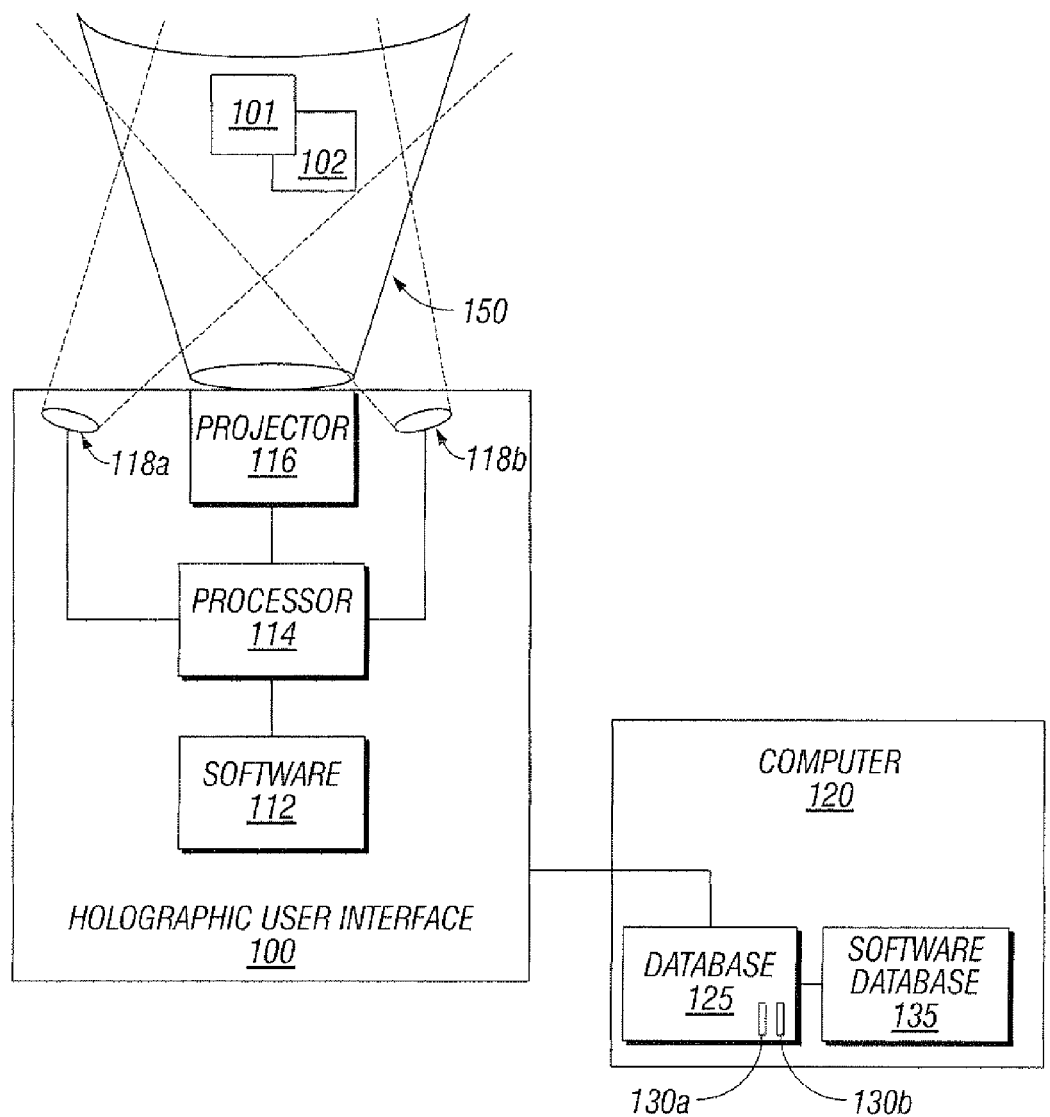
FIG. 1 is a block diagram illustrating a holographic user interface according to an example embodiment of the present invention.

FIG. 1 illustrates a holographic user interface 100 according to one example embodiment of the present invention. The holographic user interface 100 includes a processor 114 that operates software 112, controls a holographic image projector 116, and processes information obtained from sensors 118a, 118b. The processor 114 receives user interaction information from the sensors 118a, 118b in response to the sensors 118a, 118b being activated upon interception of a path of the sensors 118a, 118b.

The projector 116 may generate and display in a 3-D display image 101, 102 within a 3-D coordinate system 150 in response to a user's desired selection. The displayed image 101, 102 may be one type of holographic keyboard 605 (FIG. 6) amongst a plurality of holographic keyboards. The sensors 118a and 118b may be directed toward the 3-D coordinate system to sense user interaction with images (e.g., holographic keyboard 605) within the 3-D coordinate system. If a user were to interact with an image 101 or 102, the sensors 118a and 118b would provide coordinate information that the processor can correlate with the projected images 101 and 102 in the 3-D coordinate system. The interface 100 may communicate with a computer 120 to process and retrieve/store holograms 130a, 130b (collectively 130) in database 125. The computer 120 may also include a software database to communicate with the processor 114 to provide logic for the sensors 118a and 118b to sense the user interaction and retrieve the displayed holographic keyboard. The computer 120 may be a separate standalone unit or be integrated with the interface 100.

The 3-D projector and interface 100 are capable of displaying the holographic keyboard on a variety of surfaces. The surface may be flat, contour, non-flat, or any combination thereof type of surfaces. The system relating holographic human machine interfaces between humans and electronic or electro-mechanical equipment is described in greater details in U.S. Pat. No. 6,377,238 entitled, "Holographic Control Arrangement", which is hereby incorporated by reference in its entirety. Another system that relates to holographic human machine interfaces is U.S. Pat. No. 7,054,045 entitled, "Holographic Human-Machine Interfaces", which is hereby incorporated by reference in its entirety. For more details on a holographic keyboard to display on a flat surface is described in greater details in U.S. Published patent application Number 2002/0070921 entitled, "Holographic Keyboard", which is hereby incorporated by reference in its entirety. Moreover, the interface 100 may project the holographic keyboard in thin air rather than on a surface.

The database 125 may store the plurality of holograms 130 having a variety of different type of keyboards 605. The database 125 may communicate with the 3-D projector 116 via the interface 100 to generate and display the one type of keyboard 605.

Figure 2:
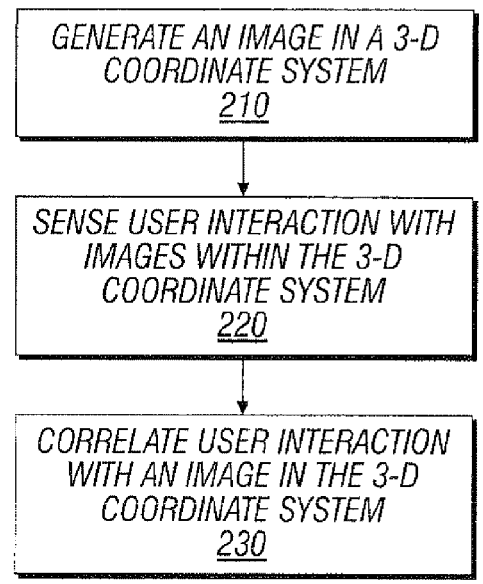
FIG. 2 is a flow chart diagram illustrating a method for providing a 3-dimensional (3-D) interface with a system according to an example embodiment of the present invention.

FIG. 2 is a flow chart that illustrates the method for providing a 3-dimensional (3-D) interface with a system. The interface generates (210) an image in a 3-D coordinate system. In operation, an embodiment of the interface deploys holographic information in the form of a user interface template as a default once turned on. Sensors on the interface sense (220) a user's interaction with the 3-D coordinate system. The sensing may occur through the use of matrixes or triangulated data points that correspond to specific functions and data display which the system is capable of displaying. The interface may then correlate (230) the user's interaction with an image in the 3-D coordinate system. By sensing and correlating interaction with the 3-D coordinate system, the interface allows a computer system or display to interact with a user. The holographic data displayed by the system becomes a result of a selection process by the user who triggers data being displayed by key strokes or by the use of a three-dimensional interactive interface. Users' location commands are read by the system at their exact points and then the system deploys the appropriate response or holographic media based upon the users' specific request made via the location of that request.

Figure 3:
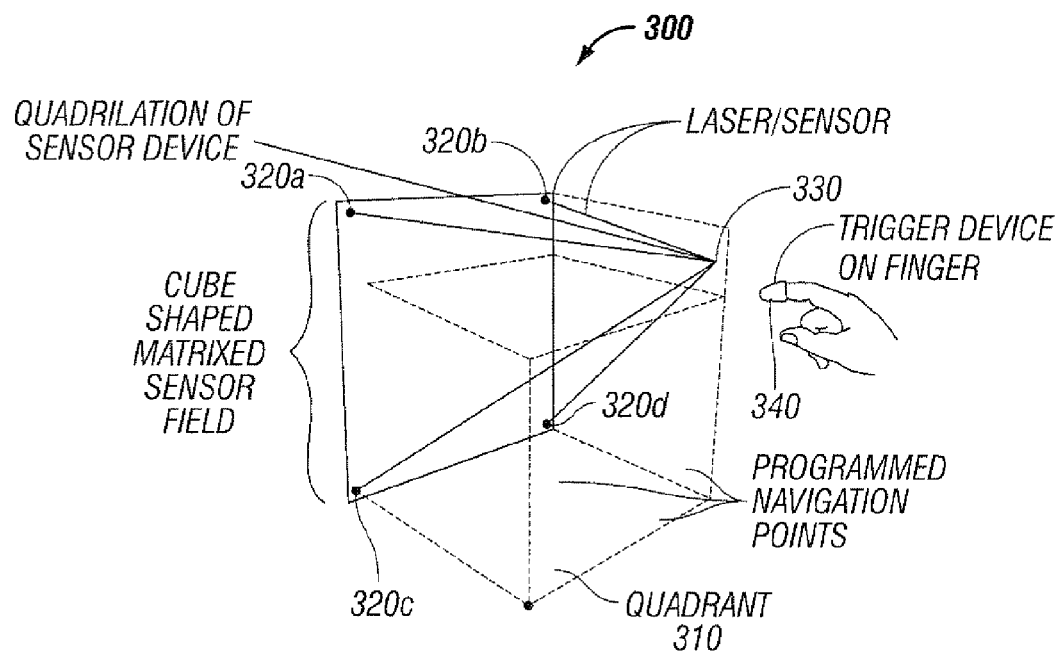
FIG. 3 is a perspective view of sensor field used in connection according to an example embodiment of the present invention.

FIG. 3 illustrates a sensor field used in connection with embodiments of the present invention. The embodiment illustrated in FIG. 3 includes four laser sensors 320a-d. The manipulatable interface may be a relatable and interactive holographic media via the use of a sprocketed sensor system which deploys from the display either via a built in or retrofit hardware peripheral that creates a quadrilateral angle navigation system to determine the exact point 330 of a fingertip touch point 340 within a quadrant 310 (also referred to as a "3-D coordinate system"). This touch point, if effectively deployed by the user, is mapped to the image deployed by the holographic hardware and software system, as each image that is displayed in the system is displayed from an exacting point at an exacting place in space that has been preconfigured to match specific points on the quadrilateral sensor system. The points in space attached to programmed images are then matched to touch points made by the user. The touch point may trigger the same functions as a mouse and cursor. The sensors 118a, 118b may be activated upon the interception of the path by a user placing a finger (e.g., 340) through a key of the holographic keyboard 605.

One skilled in the art will recognize that other sensing configurations or devices may be used to sense a location within a 3-D coordinate system. For example, the sensors may be laser sensors configured to provide data to triangulate a point within the 3-D coordinate system, photo voltaic sensors, photo electric light sensors, or image sensors. The sensors may be programmed to identify the specific location of the touchpoint 330 that may extend through multiple planar images, to identify a single image located at a 3-D coordinate space.

Figure 4:
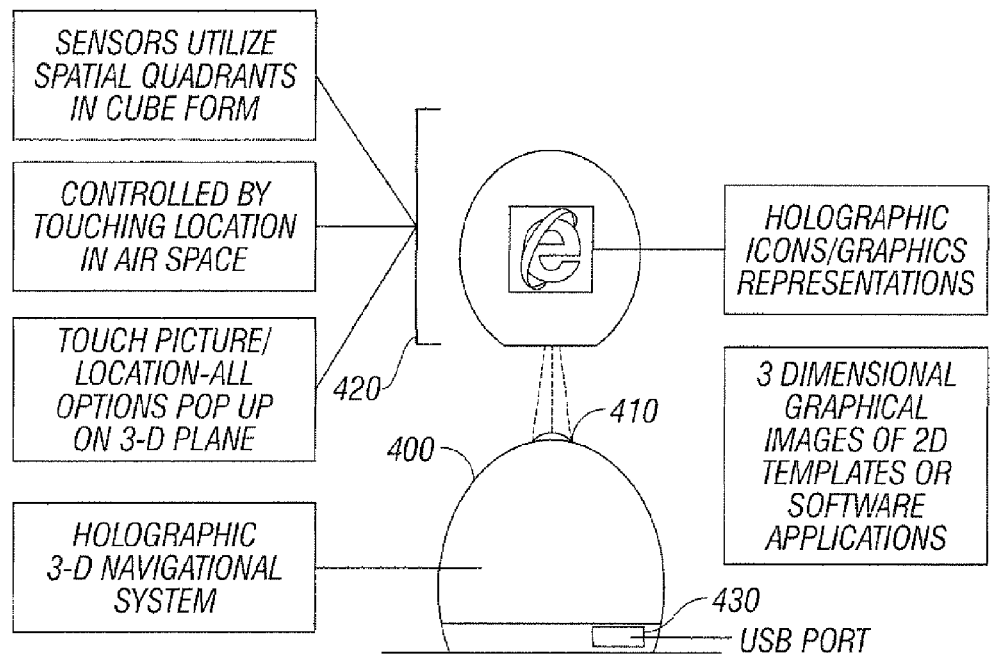
FIG. 4 is a front view of a holographic user interface device according to one example embodiment of the present invention.

FIG. 4 illustrates a holographic user interface device 400 according to one embodiment of the present invention. The device 400 has a port 410 that may provide the output projector for the multi-dimensional display, and also the sensors for detecting user interaction. The projector and sensors map out a 3-D coordinate system 420 to serve as the holographic user interface. A communications port 430, such as a universal serial bus ("USB") port or wireless connection, serves to allow the device 400 to communicate with a computer system. The holographic system may be based upon our prior holographic system technology filing where the User Interface icons and documents may be saved to a fixed media form and activated by commands sent from the operating system to the device managing the index on the holographic fixed media system and display. Similarly, any system that utilizes holographic displays may also be manipulated and selected using the sensor interface system.

Figure 5:
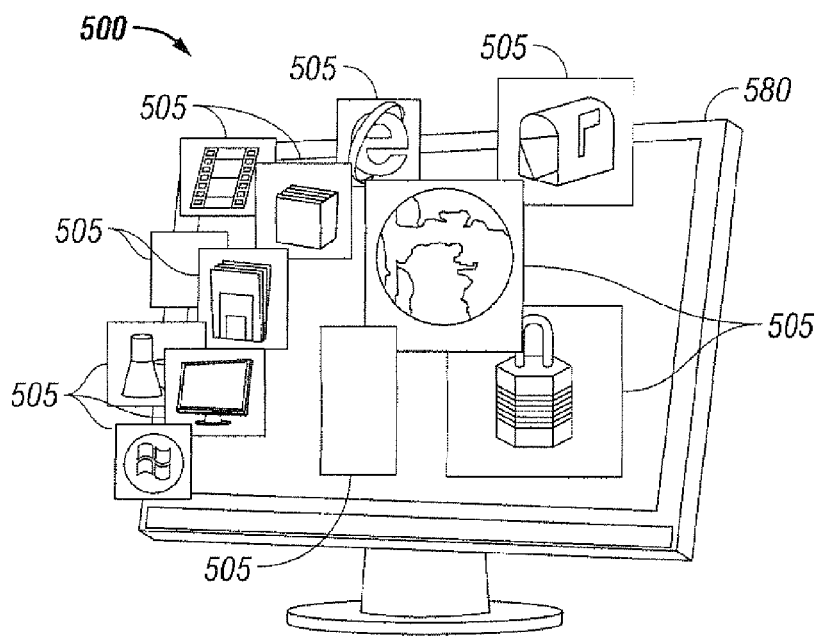
FIG. 5 is a perspective view of a diagram of a holographic user interface according to another example embodiment of the present invention.

FIG. 5 is a perspective view of a diagram of a holographic user interface 500 according to another embodiment of the present invention. The holographic user interface device may operate with a projection screen 580. Images 505 displayed by the projection screen 580 of the user interface 500 can include shapes, graphic images, animation sequences, documents, audiovisual programs, a logical display based upon the users' patterns of use with the system (such as always going online first, always working on a word document second and always viewing pictures or videos from the users' hard drive. Third, these icons could be presented to the user in an order of priority on the display representing the users' evolving use habits based upon history, including distinct changes based upon day, time and date), traditional UI operating system icons, such as Word document icons and portable document format ("PDF") icons may be presented in a holographic format. Documents may be revised and read through in a traditional manner or documents, or any displayed item may revert back to the flat display monitor based upon user command.

Figure 6:
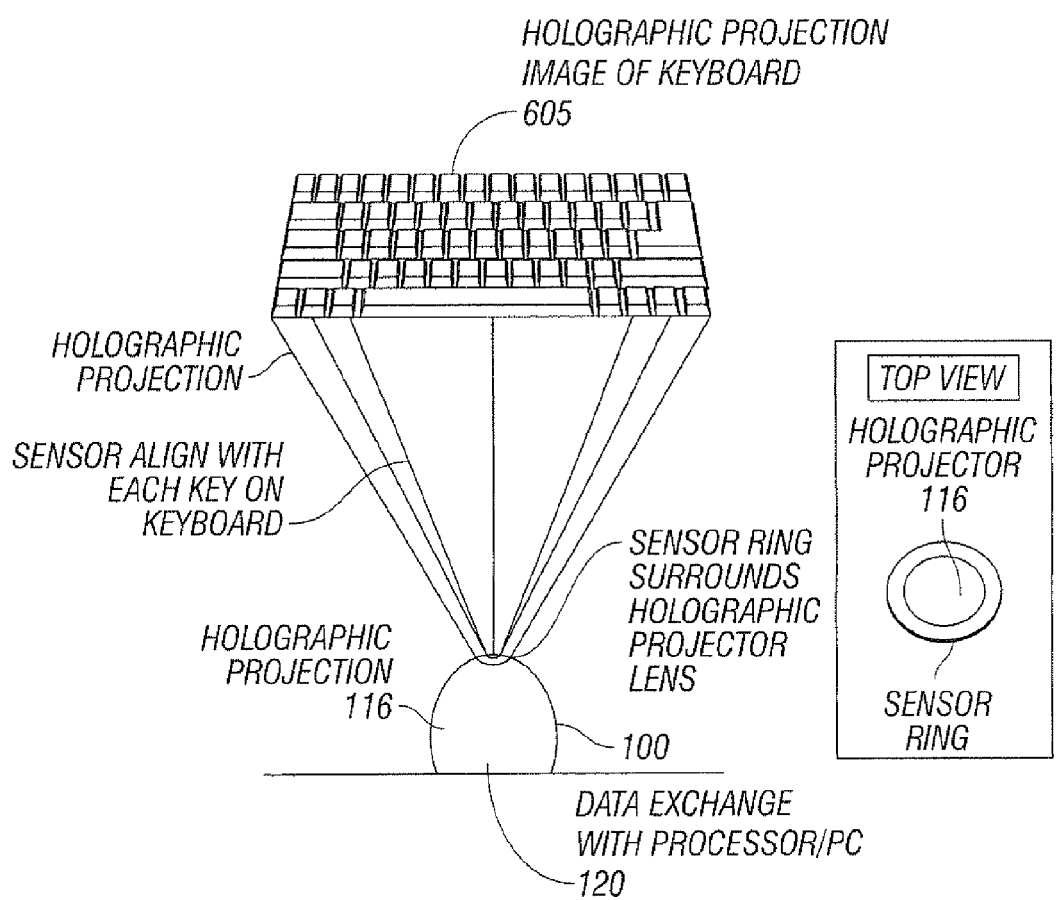
FIG. 6 is a block diagram illustrating a holographic user interface displaying a holographic keyboard according to an example embodiment of the present invention.

FIG. 6 is a block diagram illustrating a holographic user interface 100 displaying a holographic keyboard 605 according to an example embodiment of the present invention. Although most keyboards operate on the same principle, there are many variations of the type of keyboards from computer keyboards to typewriter-like keyboards. For example, there is the QWERTY keyboard developed by Sholes is now the official standard of computer keyboards ISO9995. Another type of keyboard is the Dvorak Keyboard that is easier and faster to type on when compared with other keyboards. The Chicklet keyboard is another type that is very small keyboard. The interface 100 is capable of changing the size and type of keyboards 605 so that it is more ergonomic. This feature may be advantageous to prevent health issues related to typing such as carpal tunnel syndrome. Carpal Tunnel Syndrome is an inflammatory disorder that affects the carpal (wrist) part of a specific nerve. Repetitive stress, physical trauma, certain diseases, or specific hereditary conditions can inflame the sheaths that surround wrist tendons. With the swelling of small blood vessels, pressure increases on the nerve and disrupts its functioning; numbness, pain, and a loss of manual dexterity result. Carpal Tunnel Syndrome may occur as a user does repetitive motion on his/her keyboard.

The interface 100 may communicate with a computer 120 for data exchange, in particular the retrieval of a user's desired type of hologram 130 stored in the database 125. The desired hologram 130 is then used by the interface 100 to project the holographic keyboard 605. The interface 100 may alter the size and shape of the keyboard 605 in accordance to a user's desire. Moreover, as the 3-D projector via the interface 100 may expand/enlarge a key as a user's finger approaches the key. The holographic keyboard 605 has a plurality of keys, each key corresponding to a letter of the alphabet, a punctuation mark, symbol, or number.

Figure 7:
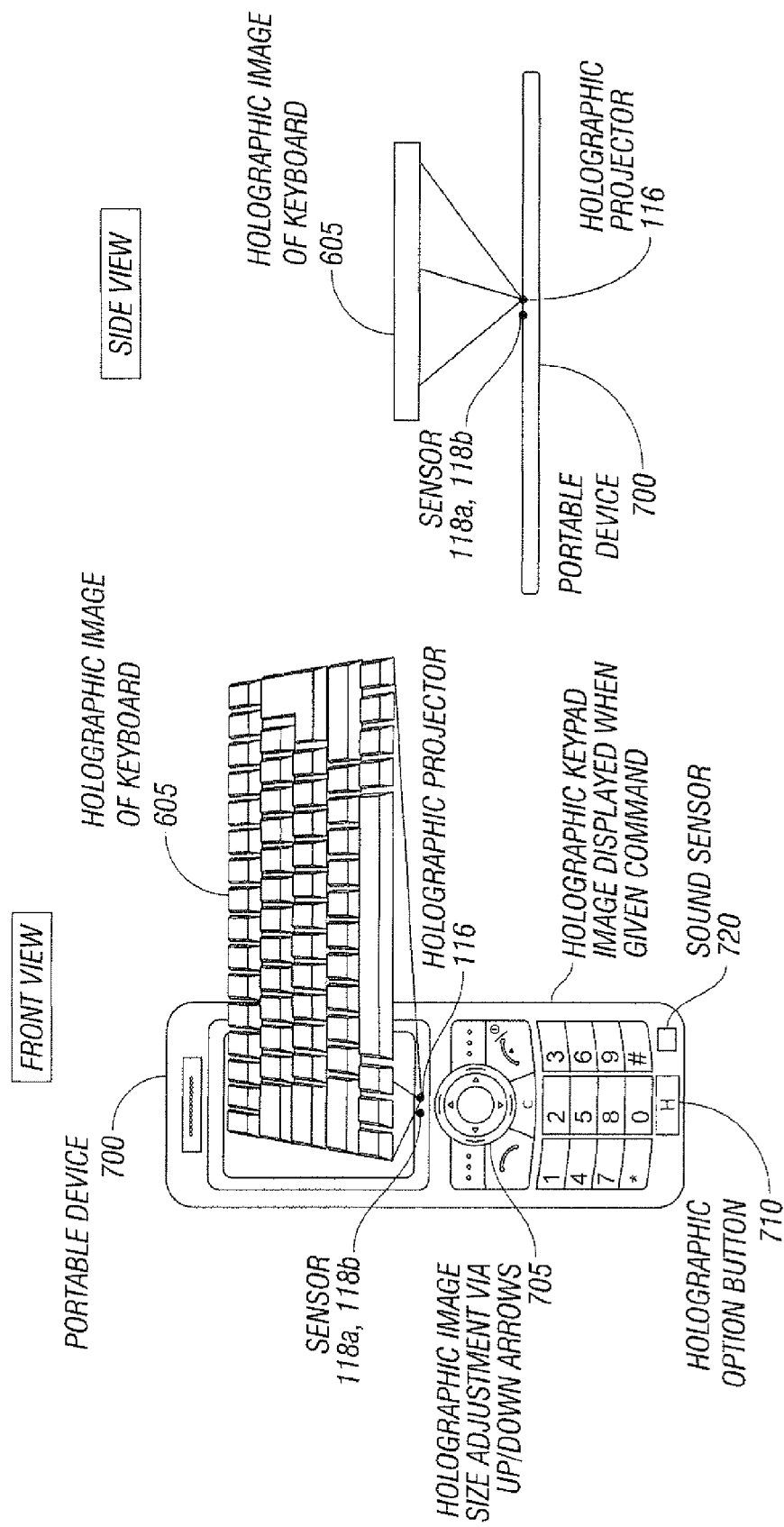
FIG. 7 is a block diagram illustrating a portable holographic user interface displaying a holographic keyboard according to an example embodiment of the present invention.

FIG. 7 is a block diagram illustrating a portable holographic user interface 700 displaying a holographic keyboard 605 according to an example embodiment of the present invention. The user interface 100 may be integrated with a portable device 700, such as a cell phone. The portable device 700 may include a button 710 to trigger the holographic projector 116 to display the holographic keyboard 605. The portable device 700 may also include other buttons, such as button 705 to adjust the size and shape of the holographic keyboard 605 to a user's desire. There may be other features for the user to choose the type of displayed holographic keyboard 605. The portable device 700 exhibits the versatility of being able to have various types of keyboards and the ergonomic features, such as the ability to alter the size and shape of the keyboards. The keypads on the keyboard 605 may also be adjusted to accommodate the user.

The portable device 700 may include a sound sensor system 720 to receive a user's voice to activate a key of the holographic keyboard. By sensing and correlating interaction with the 3-D coordinate system, the interface allows a computer system or display to interact with a user. The holographic data displayed by the system becomes a result of a selection process by the user who triggers data being displayed by key strokes or by the use of a three-dimensional interactive interface. For example, if a user says "R" into the sound sensor 720, the letter "R" appears on a monitor, such as a computer monitor (not shown).

Figure 8:
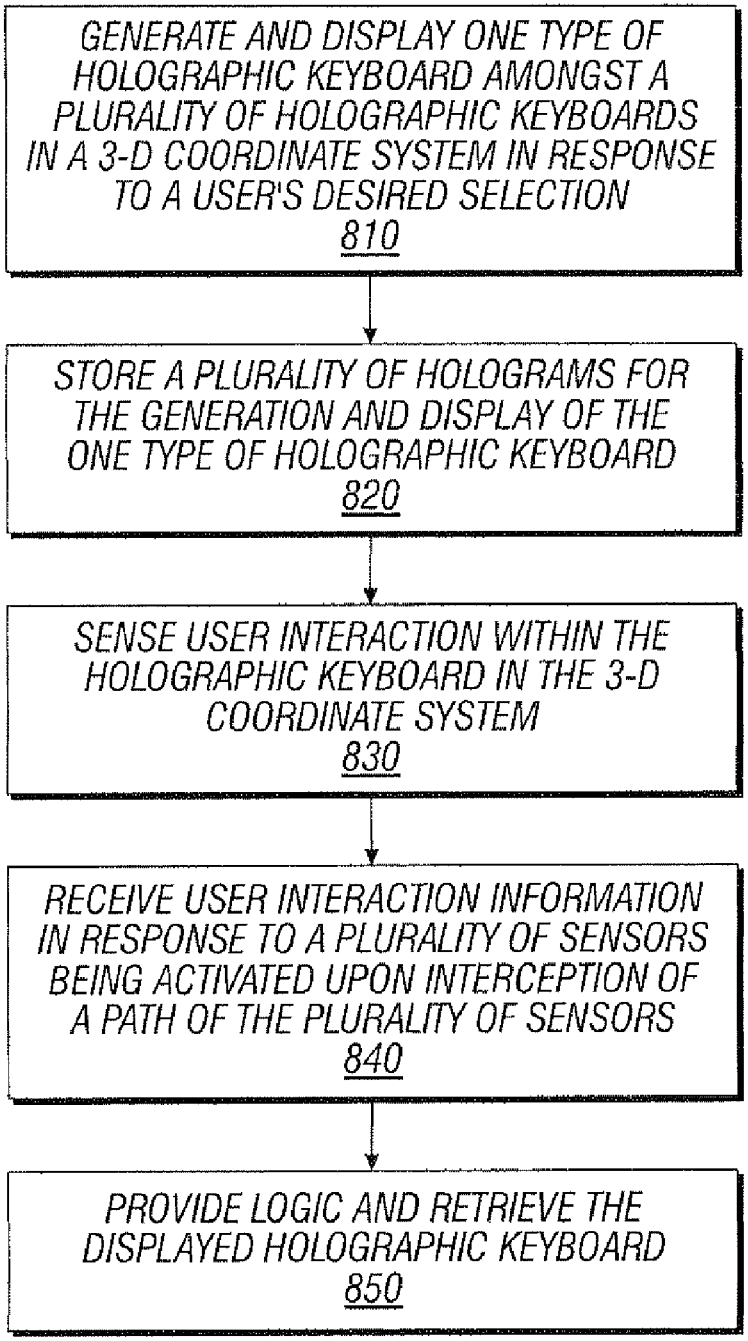
FIG. 8 is a flow chart diagram illustrating a method for providing a 3-dimensional (3-D) interface with a system to display a holographic keyboard according to an example embodiment of the present invention.

FIG. 8 is a flow chart diagram illustrating a method for providing a 3-dimensional (3-D) interface with a system to display a holographic keyboard (e.g., 605). The interface generates and displays one type of holographic keyboard amongst a plurality of holographic keyboards in a 3-D coordinate system in response to a user's desired selection (810). In operation, an embodiment of the interface deploys holographic information in the form of a user interface template as a default once turned on. The interface may store/load a plurality of holograms (820). The at least one database communicates with the 3-D projector to generate and display the one type of holographic keyboard. Sensors on the interface sense user interaction within the holographic keyboard in the 3-D (830). The sensing may occur through the use of matrixes or triangulated data points that correspond to specific functions and data displays which the system is capable of displaying. The interface may then correlate the user's interaction with the keyboard in the 3-D coordinate system.

The interface receives user interaction information in response to a plurality of sensors being activated upon interception of a path of the plurality of sensors (840). There are many ways in which the plurality of sensors can be activated. For example, a Light Amplification by Stimulated Emission of Radiation (LASER) may intercept or break the path of the plurality of sensors. In another example, the holographic interface may include a holographic mouse in addition to the holographic keyboard. In such a situation, the holographic mouse may activate the plurality of sensors by clicking on a button on the mouse. The holographic mouse is further explained in details in U.S. patent application Ser. No. _____ entitled, "Method and Apparatus for User Interface of Input Devices" by Gene S. Fein and Edward Merritt, which is hereby incorporated by reference in its entirety. In yet another example, the interface may include a sound sensor 720 to receive a user's voice to activate a key of the holographic keyboard. By sensing and correlating interaction with the 3-D coordinate system, the interface allows a computer system or display to interact with a user. The holographic data displayed by the system becomes a result of a selection process by the user who triggers data being displayed by key strokes or by the use of a three-dimensional interactive interface. Users' location commands are read by the system at their exact points and then the system deploys the appropriate response or holographic media based upon the users' specific request made via the location of that request. The interface may store/load software to provide logic for operability of the plurality of sensors to sense the user interaction and for retrieving the displayed holographic keyboard (850).

Those of ordinary skill in the art should recognize that methods involved in providing a 3-D user interface with a system may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as electromagnetic signals propagating on a computer network, a bus or a communications link, either optical, wired, or wireless, carrying program code segments as digital or analog data signals. The program code enables and supports computer implementation of the operations described in FIGS. 1, 2, 6, 7, 8 or other embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A system, comprising:
   a database configured to store data related to a plurality of types of holographic keyboards;
   a 3-dimensional (3-D) projector;
   a processor coupled with the database and the 3-D projector and configured to:
      receive a selection of a type of holographic keyboard, the type being one of the plurality of types of holographic keyboards;
      control the 3-D projector to generate and display a holographic keyboard of the selected type of holographic keyboard in a 3-D coordinate system, wherein the type of holographic keyboard is selected based on sensed user interaction with the holographic keyboard or based on sensed user interaction with a physical user interface; and
      control the 3-D projector to generate a holographic user interface that presents a plurality of application icons in holographic format, wherein the application icons in holographic format are presented based on user pattern of use, including presentation in an order of priority that is representative of changes in user use habits according to day, time, and date; and
   a plurality of sensors configured to sense user interaction with the holographic keyboard;
   wherein the processor is further coupled with the plurality of sensors and is further configured to:
      determine, based on information received from at least one sensor of the plurality of sensors, that an object approaches a key of the holographic keyboard; and
      control the 3-D projector to enlarge the key based on determination that the object approaches the key.

2. The system of claim 1, wherein the 3-D projector is configured to display the holographic keyboard on a surface.

3. The system of claim 1, wherein the 3-D projector is configured to display the holographic keyboard in air.

4. The system of claim 1, wherein the plurality of sensors are configured to sense user interaction with the key of the holographic keyboard upon a user placing a finger through or upon the key.

5. The system of claim 1, further comprising:
   a first communications port; and
   a computer including:
      a second communications port communicatively coupled with the first communications port; and
      the database.

6. The system of claim 1 wherein the plurality of sensors are photo voltaic sensors.

7. The system of claim 1 wherein the plurality of sensors are image sensors.

8. The system of claim 1 wherein the plurality of sensors are photo electric light sensors.

9. The system of claim 1 wherein the plurality of sensors are laser sensors.

10. The system of claim 1, wherein the processor is further configured to receive an indication of the selection based on information received from one or more sensors of the plurality of sensors.

11. The system of claim 1, further comprising a sound sensor system configured to receive a user's voice as input.

12. A method, comprising:
receiving a selection of a type of holographic keyboard;
accessing, based on said receiving, data related to the selected type of holographic keyboard from a database storing data related to the type of holographic keyboard;
generating and displaying, based on said accessing, a holographic keyboard of the type of holographic keyboard in a 3-D coordinate system;
generating a holographic user interface that presents a plurality of application icons in holographic format, wherein the application icons in holographic format are presented based on user pattern of use, including presentation in an order of priority that is representative of changes in user use habits according to day, time, and date;
sensing user interaction with the holographic keyboard;
determining that an object approaches a key of the holographic keyboard; and
enlarging the key based on said determining that the object approaches the key.

13. The method of claim 12, further comprising:
generating a path with a sensor;
wherein said sensing user interaction is based upon interception of the path.

14. The method of claim 12, wherein said generating and displaying the holographic comprises displaying the holographic keyboard on a surface.

15. The method of claim 12, wherein said generating and displaying the holographic keyboard comprises displaying the holographic keyboard in air.

16. The method of claim 12, wherein said sensing user interaction includes using laser sensors to geometrically identify a position within the 3-D coordinate system.

17. The method of claim 16, wherein said using laser sensors to geometrically identify includes using laser sensors to triangulate a position within the 3-D coordinate system.

18. The method of claim 16, wherein said using laser sensors to geometrically identify includes using laser sensors to quadrilate a position within the 3-D coordinate system.

19. A non-transitory computer-readable medium having computer readable program codes embodied therein that, if executed, cause a computer to:
generate and display a holographic keyboard in a 3-D coordinate system;
generate a holographic user interface that presents a plurality of application icons in holographic format, wherein the application icons in holographic format are presented based on user pattern of use, including presentation in an order of priority that is representative of changes in user use habits according to day, time, and date;
sense user interaction with the holographic keyboard;
determine that an object approaches a key of the holographic keyboard; and
enlarge the key based on said determining that the object approaches the key.

20. The non-transitory computer-readable medium of claim 19, wherein the computer-readable program codes, if executed, further cause the computer to:
receive a selection of a type of holographic keyboard to display based on sensed user interaction with the holographic keyboard.

21. The non-transitory computer-readable medium of claim 19, wherein the computer-readable program codes, if executed, further cause the computer to:
receive a selection of a type of holographic keyboard to display based on sensed user interaction with a physical user interface.

22. A system, comprising:
a 3-dimensional (3-D) projector configured to display a holographic keyboard in a 3-D coordinate system and configured to display a holographic user interface that presents a plurality of application icons in holographic format, wherein the application icons in holographic format are presented based on user pattern of use, including presentation in an order of priority that is representative of changes in user use habits according to day, time, and date;
a plurality of sensors configured to sense user interaction with the holographic keyboard; and
a processor coupled with the plurality of sensors and the 3-D projector and configured to:
determine, based on information received from at least one sensor of the plurality of sensors, that an object approaches a key of the holographic keyboard; and
control the 3-D projector to enlarge the key based on determination that the object approaches the key.

23. The system of claim 22, wherein the 3-D projector is configured to display the holographic keyboard on a surface.

24. The system of claim 22, wherein the 3-D projector is configured to display the holographic keyboard in air.

25. The system of claim 22 wherein the plurality of sensors are photo voltaic sensors, image sensors, photo electric light sensors, or laser sensors.

* * * * *

UNITED STATES PATENT AND TRADEMARK OFFICE
CERTIFICATE OF CORRECTION

| | | |
|---|---|---|
| PATENT NO. | : 8,212,768 B2 | Page 1 of 1 |
| APPLICATION NO. | : 11/932731 | |
| DATED | : July 3, 2012 | |
| INVENTOR(S) | : Fein et al. | |

It is certified that error appears in the above-identified patent and that said Letters Patent is hereby corrected as shown below:

In Column 3, Line 29, delete "triethanolomine," and insert -- triethanolamine, --, therefor.

In Column 5, Line 65, delete "follows." and insert -- follows: --, therefor.

In Column 8, Line 26, delete "Chicklet" and insert -- Chiclet --, therefor.

In Column 8, Line 36, delete "functioning;" and insert -- functioning, --, therefor.

In Column 11, Line 33, in Claim 14, delete "holographic" and insert -- holographic keyboard --, therefor.

Signed and Sealed this
Twentieth Day of November, 2012

David J. Kappos
*Director of the United States Patent and Trademark Office*